United States Patent
Lu et al.

(10) Patent No.: US 9,709,849 B2
(45) Date of Patent: Jul. 18, 2017

(54) REFLECTIVE SHEET WITH MOVABLE VANE STRUCTURE

(71) Applicant: BOE Technology Group Co., Ltd., Beijing (CN)

(72) Inventors: Yongchun Lu, Beijing (CN); Yong Qiao, Beijing (CN); Hongfei Cheng, Beijing (CN); Jianbo Xian, Beijing (CN); Yongda Ma, Beijing (CN); Jian Xu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/787,501

(22) PCT Filed: May 7, 2015

(86) PCT No.: PCT/CN2015/078484
§ 371 (c)(1),
(2) Date: Oct. 28, 2015

(87) PCT Pub. No.: WO2016/050067
PCT Pub. Date: Apr. 7, 2016

(65) Prior Publication Data
US 2016/0252775 A1    Sep. 1, 2016

(30) Foreign Application Priority Data
Sep. 30, 2014 (CN) .................... 2014 2 0575536 U

(51) Int. Cl.
*G02F 1/00* (2006.01)
*G02F 1/1335* (2006.01)

(52) U.S. Cl.
CPC .. *G02F 1/133605* (2013.01); *G02F 1/133603* (2013.01)

(58) Field of Classification Search
CPC ............. G02F 1/133605; G02F 1/1336; G02F 1/133603; F21V 7/10
(Continued)

(56) References Cited

U.S. PATENT DOCUMENTS

| | | | |
|---|---|---|---|
| 2015/0048514 A1* | 2/2015 | Tang | ..................... H01L 21/768 257/774 |
| 2015/0211715 A1* | 7/2015 | Song | ................. G02F 1/133608 362/97.3 |

FOREIGN PATENT DOCUMENTS

| CN | 101900308 A | 12/2010 |
|---|---|---|
| CN | 103511991 A | 1/2014 |

(Continued)

OTHER PUBLICATIONS

Jul. 23, 2015—International Search Report Appn PCT/CN2015/078484 with Eng Tran of Written Opinion.

*Primary Examiner* — Sean Gramling
*Assistant Examiner* — Gerald J Sufleta, II
(74) *Attorney, Agent, or Firm* — Banner & Witcoff, Ltd.

(57) ABSTRACT

A reflective sheet, a backlight module and a display device are disclosed. The reflective sheet includes a reflective sheet body provided with a plurality of opening areas and an open-closed structure located in each of the opening areas. The open-closed structure comprises at least a movable type vane, and one side of the movable type vane is connected with an edge of the opening area of the reflective sheet body. The movable type vane has a reflective surface, and the reflective surface of the movable type vane is disposed on the same side as a reflective surface of the reflective sheet body. The reflective sheet body is able to alleviate the interference in reflection effect of light ray due to the positioning posts, thus, a good display quality can be achieved.

3 Claims, 2 Drawing Sheets

(58) Field of Classification Search
USPC .......................................................... 362/97
See application file for complete search history.

(56) References Cited

FOREIGN PATENT DOCUMENTS

| | | |
|---|---|---|
| CN | 203658711 U | 6/2014 |
| CN | 203771294 U | 8/2014 |
| CN | 204100138 U | 1/2015 |
| JP | 2009037946 A | 2/2009 |
| KR | 20100032236 A | 3/2010 |

* cited by examiner

REFLECTIVE SHEET WITH MOVABLE VANE STRUCTURE

The application is a U.S. National Phase Entry of International Application No. PCT/CN2015/078484 filed on May 7, 2015, designating the United States of America and claiming priority to Chinese Patent Application No. 201420575536.1 filed on Sep. 30, 2014. The present application claims priority to and the benefit of the above-identified applications and the above-identified applications are incorporated by reference herein in their entirety.

TECHNICAL FIELD

Embodiments of present invention relate to a reflective sheet, a backlight module comprising the reflective sheet and a display device comprising the backlight module.

BACKGROUND

According to disposition locations of light sources in a backlight module, the backlight modules may be classified into two types, edge-lit type and direct-lit type. In the direct-lit type backlight module, light sources are disposed directly below a liquid crystal display panel, so that the liquid crystal display panel can achieve high light intensity, so liquid crystal display products of this type are mostly used in displays with high brightness requirements, such as computer displays, liquid crystal televisions, etc.

In large-size liquid crystal display products, as shown in FIG. 1, in order to avoid causing a dislocation between light sources 50 and a reflective sheet 20 in a backlight module because of the shock during a process of carrying display devices, positioning posts 30 in existing direct-lit type backlight modules are disposed on a back plate 10, a reflective sheet 20 located on the back plate 10 is provided with a plurality of opening areas 200 at locations corresponding to the positioning posts 30, and top ends of the positioning posts 30 penetrate through the opening areas 200 for securing the reflective sheet 20.

However, the positioning posts 30 are usually made of a transparent material, and the transparent positioning posts are located between the reflective sheet 20 and the light sources 50, which will influence the reflection effect of light rays, so that viewers may see remnant profile shadow of the positioning posts 30 on the display screen, which leads to poor display quality.

SUMMARY

In one aspect, the present invention provides a reflective sheet, comprising a reflective sheet body provided with a plurality of opening areas and an open-closed structure disposed in each of the opening areas; the open-closed structure comprises at least one movable vane, and one side of the movable vane is connected with an edge of the opening area of the reflective sheet body; the movable vane has a reflective surface, and the reflective surface of the movable vane is disposed on a same side as a reflective surface of the reflective sheet body.

In one example, the opening area is a polygonal opening area.

In one example, the open-closed structure is one movable vane which is matched with the polygonal opening area.

In one example, the open-closed structure comprises a plurality of movable vanes; a number of the movable vanes is same as a number of edges of the polygonal opening area, and the plurality of movable vanes are connected with respective edges of the polygonal opening area.

In one example, the plurality of movable vanes are matched with the polygonal opening area in a closed state.

In one example, the plurality of movable vanes are all triangular movable vanes.

In one example, the reflective sheet further comprises a plurality of apertures, which are disposed on the reflective sheet body; and the plurality of apertures are arranged as an array on the reflective sheet body.

In one example, the apertures and the open-closed structures are aligned alternately in rows on the reflective sheet body, and the apertures and the open-closed structures are aligned with each other in a column direction; alternatively, the apertures and the open-closed structures are arranged alternately in columns on the reflective sheet body, and the apertures and the open-closed structures are aligned with each other in a row direction.

In another aspect, the present invention provides a backlight module, comprising a back plate and a plurality of positioning posts secured on the back plate; and the backlight module further comprises the aforementioned reflective sheet; wherein locations of the positioning posts correspond to locations of the open-closed structures of the reflective sheet, and the positioning posts are configured for penetrating through the opening areas of the reflective sheet, to open the open-closed structure.

In one example, a number of the open-closed structures is larger than a number of positioning posts.

In one example, the reflective sheet further comprises a plurality of apertures disposed on the reflective sheet body, and the backlight module further comprises light sources and an optical sheet; the light sources comprise a plurality of light emitting diodes (LEDs) arranged in an array; wherein, in the situation that the reflective sheet comprises the apertures, locations of the plurality of light emitting diodes are in one to one correspondence with locations of the plurality apertures of the reflective sheet.

In another further aspect, the present invention provides a display device, comprising the aforementioned backlight module.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

REFERENCE NUMERALS

10: back plate; 20: reflective sheet; 200: opening area; 201: reflective sheet body; 202: open-closed structure; 203: aperture; 30: positioning post; 40: optical sheet; 50: light source; 60: display panel

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Embodiments of the present invention will provide a reflective sheet, a backlight module and a display device, which are able to alleviate the interference in the reflection effect of light rays due to the positioning posts, so that the viewers cannot see remnant profile shadow of the positioning posts on the display screen, thus, better display quality can be achieved.

Figure 1:
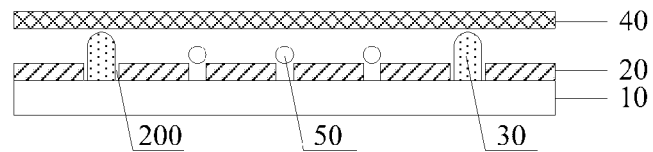
FIG. 1 is a schematically structural view of a conventional backlight module.
Figure 2:
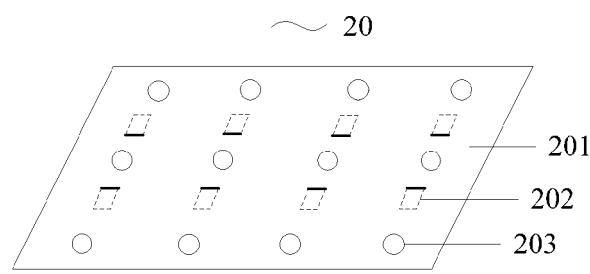
FIG. 2 is a schematically structural view of a reflective sheet provided by an embodiment of the present invention.
Figure 3:
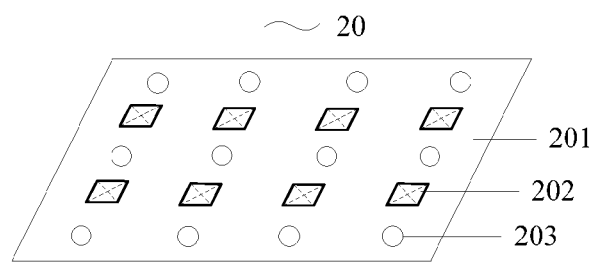
FIG. 3 is a schematically structural view of another reflective sheet provided by an embodiment of the present invention.

An embodiment of the present invention provides a reflective sheet 20, as shown in FIGS. 2 and 3, comprising a reflective sheet body 201 provided with a plurality of opening areas and an open-closed structure 202 located in each of the opening areas; the open-closed structure 202 comprises at least a movable vane, and one side of the movable vane is connected with an edge of the opening area of the reflective sheet body 201; the movable vane has a reflective surface, and the reflective surface of the movable vane is disposed on a same side as a reflective surface of the reflective sheet body.

The open-closed structure 202 of the opening area can present two states according to practical situations, including an opening state and a closed state. In the situation that positioning posts or other structures are disposed below the open-closed structure 202 correspondingly, the movable vane of the open-closed structure 202 can be jacked up by the positioning posts or other structures which penetrate through the opening areas, thus, the open-closed structure 202 is in the opening state; in the situation that the positioning posts or other structures are not disposed below the open-closed structure 202, the movable vane of the open-closed structure 202 can fall down and locate in the same plane with reflective sheet body 201, thus, the open-closed structure 202 is in the closed state.

One side of the movable vane is connected with an edge of the opening area of the reflective sheet body 201, so as to ensure that in the situation that the movable vanes are jacked up by, for example, the positioning posts, the movable vanes would not be constrained by outer forces and would achieve the opening state.

In the case that the reflective sheet 20 is applied to the backlight module in the liquid crystal display device, locations of the opening areas should correspond to locations of the positioning posts of the backlight module. For example, two situations below may be comprised: the location of the opening area has a one-to-one correspondence with the location of the positioning post; alternatively, the location of the opening area correspond to not only the location of the positioning post but also the location without the positioning post. It is known that, based on this, in the embodiments of the present invention, the number of the opening areas is larger than or equals to the number of the positioning posts.

The shape of the opening areas may comprise various shapes, but it should be ensured that the positioning posts of the backlight module can penetrate through the opening areas to define the location of the reflective sheet 20, so that they cannot move relative to the opening areas. For example, in the situation that the positioning posts are cylindrical positioning posts, the shape of the opening areas may be circular openings which are matched with the cylindrical positioning posts, but the shape of the opening areas may also be other shapes, such as externally-tangent triangular or rectangular shape, etc, which contacts with the side surface of the cylindrical positioning posts, as long as it can be ensured that the opening areas cannot move with respect to the positioning posts in the plane parallel to the reflective sheet 20.

Accordingly, the shape of all the movable vanes may be same as the shape of the opening areas or may be different from the shape of the opening areas, as long as it can be ensured that all the movable vanes can fall entirely in the opening areas while the movable vanes are in the closed state. The actual shape of each of the movable vanes is not defined specifically here.

The reflective sheet body 201 and the open-closed structure 202 may be made of reflective materials, for example, metals such as silver, aluminum, gold, chromium, copper, indium, iridium, nickel, platinum, tin, etc or alloy materials. Alternatively, the reflective sheet body 201 or the open-closed structure 202 is coated with a layer of reflective coating, for example, the reflective coating is made from yellow-resistant and heat-resistant white reflective paint materials, as long as they have good reflection effects and stable physicochemical properties. In one example, the reflective sheet body 201 and the open-closed structure 202 are made of the same reflective material.

In the case that the reflective sheet 20 provided by the embodiments of the present invention is applied to the backlight module, the positioning posts which are secured on the back plate can penetrate through the opening areas to open the open-closed structures 202; based on this, the movable vanes of the open-closed structures 202 can be jacked up by the positioning posts and shield the surfaces of the positioning posts, so as not to expose the positioning posts between the light sources directly. As a result, the interference in the reflection effect of light ray due to the positioning posts can be alleviated effectively, and the viewers cannot see the remnant profile shadow of the positioning posts on the display screen, thus, the display quality can be improved.

In one example, the opening areas of the reflective sheet 20 are polygonal opening areas.

The polygonal opening areas may be arranged on the reflective sheet body 201 uniformly, and at least a movable vane which is connected with the polygonal opening area may be disposed in each of the polygonal opening areas.

It can be contemplated that, in the embodiments of the present invention, the movable vanes may be disposed in a portion of the opening areas, for example, the opening areas located in the middle of the reflective sheet body 201, so as to alleviate the interference in reflection effect of light ray due to the positioning posts.

Herein it is to be noted that, whether the open-closed structures 202 comprising the movable vanes are disposed in each of the opening areas or in a portion of the opening areas, they are both within the scope of the present invention.

As shown in FIG. 2, the open-closed structure 202 may be a movable vane which is matched with the polygonal opening area.

Herein it is to be noted that, "the movable vane is matched with the polygonal opening area" means that, the shape and size of the movable vane are matched with the shape and size of the polygonal opening area, that is to say, the movable vane and the polygonal opening area can coincide completely in the closed state. However, the scope of the present invention do not limit to this, it also can be that the area of the movable vane is slightly smaller than the area of the polygonal opening area, as long as it can be ensured that projection of the movable vane in the closed state can fall entirely in a region covered by the polygonal opening area, and others are not further defined.

Figure 4:
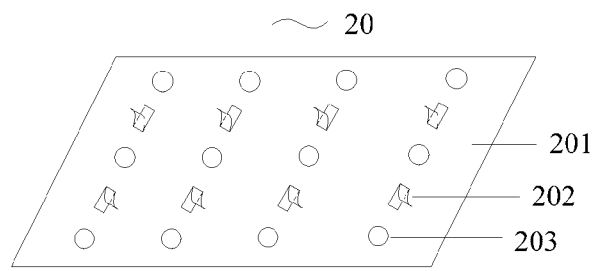
FIG. 4 is a schematically structural view of the open-closed structures of the reflective sheet shown in FIG. 2 in an opening state.

As an example, referring to FIG. 2, in the situation that the opening areas of the reflective sheet 20 are rectangular opening areas, the open-closed structure 202 may be a rectangular movable vane which is matched with the rectangular opening area. One side of the rectangular movable vane is connected with an edge of the opening areas of the reflective sheet body 201, and the other three sides of the rectangular movable vane are in a state free of connection. In this situation, as shown in FIG. 4, the positioning posts below the open-closed structure 202 penetrate through the opening areas to jack up the rectangular movable vane. Since only one side of the rectangular movable vane is connected with the reflective sheet body 201, the rectangular movable vane is tilted to the connection side, so as to reflect the light ray from the same connection side.

In view of practical applications, light ray required to be reflected exists in the circumference of the positioning posts of the backlight module, so reflecting light ray from connection side of the positioning posts cannot achieve the desired display quality; for this reason, referring to FIG. 3, the open-closed structure 202 comprises a plurality of movable vanes (for example, four movable vanes); wherein the number of the movable vanes equals to the number of sides of the polygonal opening area, and each of the movable vanes is connected with the respective sides of the polygonal opening area.

In this way, while the positioning post below the open closed structure 202 penetrates through the opening area to jack up the movable vanes, the movable vanes configured for reflecting light ray are tilted to several various directions and surround the positioning post, so that light ray from various directions can be reflected uniformly, thus the light can be emitted uniformly. The plurality of movable vanes are matched with the polygonal opening area in the closed state.

The shape of the plurality of the movable vanes may be triangular or any other shape, but it should be ensured that the shape constituted by the plurality of the movable vanes is matched with the shape of the polygonal opening area; that is to say, the shape of the plurality of the movable vanes are complementary with each other, i.e., a side of the movable vane coincides with the adjacent side of adjacent moveable vane, thus constituting the shape matched with the polygonal opening area.

For example, the plurality of the movable vanes may all be triangular movable vanes.

Since the opening areas are polygonal opening areas, it is easier for the triangular movable vanes to be disposed in the polygonal opening area than other shape movable vanes, thus, the design of the movable vanes can be simplified.

Adjacent sides of the adjacent triangular movable vanes may coincide with each other in the closed state; that is to say, a shape profile constituted by the four triangular movable vanes in the closed state overlaps the polygonal opening area completely. In this way, the triangular movable vanes in the opening state can reflect circumferential light ray to the maximum extent and a uniform reflective light can be obtained, thus, the display quality can be improved.

Referring to FIGS. 2 and 3, the reflective sheet 20 further comprises a plurality of apertures 203, which are disposed on the reflective sheet body 201; and the plurality of apertures 203 are arranged as an array on the reflective sheet body 201.

The apertures 203 are configured to make dot light sources of the backlight module, for example, light emitting diodes, to penetrate therethrough, so the shape of the apertures 203 depends on the shape of the light emitting diodes. The shape of the apertures 203 may comprise, for example, any shape, such as triangular, circular, oval, rectangular, etc.

The apertures 203 and the open-closed structures 202 may be arranged alternately in rows on the reflective sheet body 201, and the apertures 203 and the open-closed structures 202 are aligned with each other in a column direction; alternatively, the apertures 203 and the open-closed structures 202 may also be arranged alternately in columns on the reflective sheet body 201, and the apertures 203 and the open-closed structures 202 are aligned with each other in a row direction.

In this way, the apertures 203 and the open-closed structure 202 can be arranged alternately in a certain direction, such that the light brightness of both sides are substantially same, and it is beneficial to achieve uniform reflection of light ray.

Figure 5:
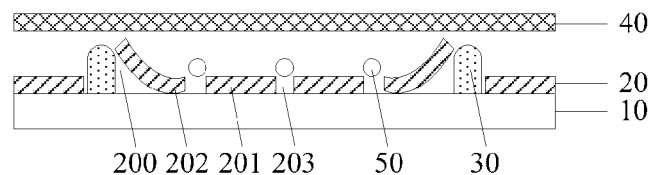
FIG. 5 is a schematically structural view of a backlight module provided by an embodiment of the present invention.
Figure 6:
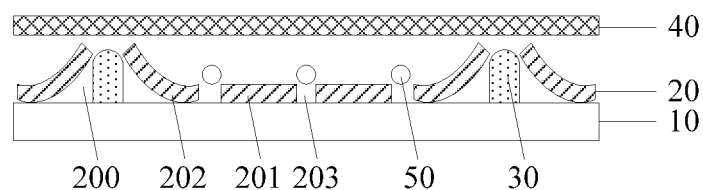
FIG. 6 is a schematically structural view of another backlight module provided by an embodiment of the present invention.

An embodiment of the present invention further provides a backlight module, as shown in FIGS. 5 and 6, comprising a back plate 10 and a plurality of positioning posts 36 secured on the back plate 10, and the aforementioned reflective sheet 20.

Locations of the positioning posts 30 correspond to locations of the open-closed structures 202 of the reflective sheet 20, and the positioning posts 30 are configured to penetrate through the opening areas 200 of the reflective sheet 20 to open the open-closed structures 202.

Herein it is to be noted that, "locations of the positioning posts 30 correspond to locations of the open-closed structures 202 of the reflective sheet 20" means that each of the positioning posts 30 has a corresponding open-closed structure 202, but it is not necessary that each of the open-closed structure 202 has a corresponding positioning post 30; that is to say, the open-closed structures 202 may have a one-to-one correspondence with the positioning posts 30, alternatively, the number of the open-closed structures 202 may be larger than the number of the positioning posts 30.

In the situation that the number of the open-closed structures 202 is larger than the number of the positioning posts 30, the open-closed structures 202 corresponding to the positioning posts 30 are configured to allow the positioning posts 30 to penetrate therethrough and cover the surface of the positioning posts 30. The open-closed structures 202 without any corresponding positioning posts 30 can provide release space for thermal stress due to thermal expansion of the reflective sheet 20, so that the reflective sheet 20 is prevented from causing uneven reflection of light ray because of thermal deformation.

Referring to FIGS. 5 and 6, the backlight module further comprises light sources 50 and an optical sheet 40; and the light sources 50 comprise a plurality of light emitting diodes arranged in an array.

In the situation that the reflective sheet 20 comprises the apertures 203, location of the plurality of light emitting diodes has a one-to-one correspondence with the location of the apertures 203 of the reflective sheet 20. It can be contemplated that, the shape and size of the apertures 203 depends on the shape and size of the light emitting diodes, and it is preferable that the shape and size of the apertures 203 are designed in such a way that the light emitting diodes can penetrate through the apertures 203 exactly.

Here, the optical sheet 40 may comprise a diffusion sheet, a prism sheet, brightness enhancement film, etc, which may be combined arbitrarily according to practical requirements. Based on this, the optical sheet 40 can be secured by a frame (not shown in figures), and the frame can be securely fixed in the back plate 10.

Figure 7:
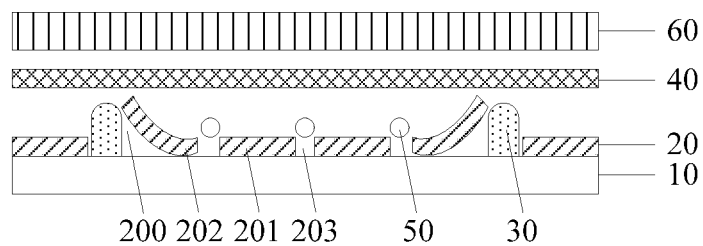
FIG. 7 is a schematically structural view of a display device provided by an embodiment of the present invention.
Figure 8:
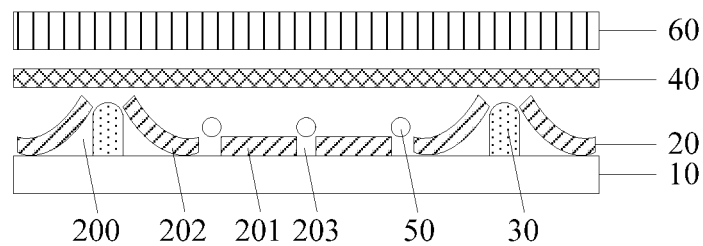
FIG. 8 is a schematically structural view of another display device provided by an embodiment of the present invention.

An embodiment of the present invention further provides a display device, as shown in FIGS. 7 and 8, comprising a display panel 60 and the aforementioned backlight module.

Herein it is to be noted that, the display device may be a non-self luminous type display device, such as liquid crystal display or liquid crystal television, etc. By means of employing the backlight module provided by the embodiments of the present invention to provide backlight, the interference in reflection effect of light ray due to the positioning posts 30 can be alleviated effectively, so that the viewers cannot see the remnant profile shadow of the positioning posts 30 on the display screen, thus, the display quality can be improved. In the situation that the number of the open-closed structures 202 is larger than the number of the positioning posts 30, a release space for thermal stress due to the thermal expansion of the reflective sheet 20 is further provided, so that the reflective sheet 20 can be effectively prevented from thermal deformation of the reflective sheet 20, thus the light can be emitted uniformly.

What is described above is related to the illustrative embodiments of the disclosure only and not limitative to the scope of the disclosure; the scopes of the disclosure are defined by the accompanying claims.

This application is based upon and claims priority from Chinese Patent Application No. 201420575536.1 filed on Sep. 30, 2014, the disclosure of which is hereby incorporated by reference herein in its entirety.

The invention claimed is:

1. A backlight module, comprising:
   a back plate and a plurality of positioning posts secured on the back plate; and
   a reflective sheet, which comprises:
      a reflective sheet body provided with a plurality of opening areas and an open-closed structure disposed in each of the opening areas;
      the open-closed structure comprises at least one movable vane, and one side of the movable vane is connected with an edge of the opening area of the reflective sheet body; the movable vane has a reflective surface, and the reflective surface of the movable vane is disposed on a same side as a reflective surface of the reflective sheet body;
   wherein the open-closed structure is configured to have an opening state whose condition is that the at least one movable vane of the open-closed structure is jacked up and configured to have a closed state whose condition is that the at least one movable vane of the open-closed structure is lowered and is located in a same plane with the reflective sheet body;
   wherein locations of the positioning posts correspond to locations of the open-closed structures of the reflective sheet, the positioning posts are configured for penetrating through the opening areas of the reflective sheet to open the open-closed structure;
   wherein a number of the open-closed structures is larger than a number of the positioning posts.

2. The backlight module according to claim 1, wherein the reflective sheet further comprises a plurality of apertures disposed on the reflective sheet body, and the backlight module further comprises light sources and an optical sheet, the light sources comprise a plurality of light emitting diodes, locations of the plurality of light emitting diodes are in one to one correspondence with locations of the plurality of apertures.

3. A display device, comprising the backlight module according to claim 1.

* * * * *